United States Patent
Chien

(10) Patent No.: US 6,168,249 B1
(45) Date of Patent: Jan. 2, 2001

(54) COMPUTER MAINFRAME HOUSING FOR COMPUTER

(76) Inventor: Chuan-Fu Chien, 15/F., No. 3, Liyuan 1st St., Linkou Hsaing, Taipei County (TW)

( * ) Notice: Under 35 U.S.C. 154(b), the term of this patent shall be extended for 0 days.

(21) Appl. No.: 09/294,317

(22) Filed: Apr. 20, 1999

(51) Int. Cl.$^7$ .................................................. A47G 29/00
(52) U.S. Cl. .................................. 312/265.4; 312/265.3; 312/265.6; 312/223.2
(58) Field of Search ............................... 312/223.1, 223.2, 312/223.3, 265.1, 265.2, 265.3, 265.4, 265.5, 265.6, 140; 403/391, 397; 211/189

(56) References Cited

U.S. PATENT DOCUMENTS

| | | | |
|---|---|---|---|
| 4,017,134 | * 4/1977 | Lenglin et al. | 312/265.1 X |
| 4,368,936 | * 1/1983 | Worrallo | 312/140 |
| 4,419,938 | * 12/1983 | Kaut | 312/140 X |
| 4,864,402 | * 9/1989 | Walter | 312/140 |
| 4,997,240 | * 3/1991 | Schmalzl et al. | 312/265.4 |
| 5,228,762 | * 7/1993 | Mascrier | 312/265.1 X |
| 5,423,604 | * 6/1995 | Chern | 312/265.1 |
| 5,647,181 | * 7/1997 | Hunts | 312/265.5 X |
| 5,997,117 | * 12/1999 | Krietzman | 312/265.4 |

FOREIGN PATENT DOCUMENTS

| | | | |
|---|---|---|---|
| 2310725 | * 12/1976 | (FR) | 312/265.4 |
| 0695180 | * 4/1953 | (GB) | 312/265.4 |
| 2226229 | * 6/1990 | (GB) | 312/265.5 |

* cited by examiner

Primary Examiner—Peter M. Cuomo
Assistant Examiner—Hanh V. Tran
(74) Attorney, Agent, or Firm—Rosenberg, Klein & Lee

(57) ABSTRACT

A computer mainframe housing for computer test purpose, which includes a rack formed by using four-way connectors to connect vertical frame bars and horizontal frame bars into a rectangular frame structure, a top board, an intermediate board and a bottom board respectively supported on the horizontal frame bar at different elevations for holding computer parts including a computer main board, a power supply device, floppy and hard diskdrives and a CD-ROM player, a plurality of clamping devices respectively symmetrically fastened to the vertical frame bars at different elevations, and four cover panels respectively fastened to the clamping devices and covered on the rack at four sides, the cover panels each having a plurality of coupling members respectively fastened to the clamping devices at the vertical frame bars, and openings for the passing of power cables and signal lines.

4 Claims, 8 Drawing Sheets

COMPUTER MAINFRAME HOUSING FOR COMPUTER

BACKGROUND OF THE INVENTION

The present invention relates to a computer mainframe housing, and more particularly to a quick-detachable computer mainframe housing for holding a computer mainframe unit for test.

Following fast development of computer technology, advanced personal computers have been continuously developed, and intensively used in different fields for data processing, word processing, inventory control, and any of a variety of purposes. Because computer parts are commonly modularized, they can easily be built up to form a personal computer by the users. FIG. 9 shows a computer housing 5 having installed therein a main board 6, a power supply device 61, a hard diskdrive 62, a floppy diskdrive 63 and a CD-ROM player 64. The computer parts are fastened to the computer housing 5 on the inside by screws 67. After installation of the computer parts, power cables 65 and signal lines 66 are respectively inserted through respective openings at the computer housing 5, and electrically connected to the computer parts in the computer housing 5. Because the computer parts are fastened to the computer housing 5 by screws 67, the installation procedure is complicated. When repairing or replacing one computer part, removal of the computer part in question takes much time and labor.

SUMMARY OF THE INVENTION

The present invention provides a computer mainframe housing for test purpose which is detachable. According to one embodiment of the present invention, the computer mainframe housing comprises a rack formed by using four-way connectors to connect vertical frame bars and horizontal frame bars into a rectangular frame structure, a top board, an intermediate board and a bottom board respectively supported on the horizontal frame bar at different elevations for holding computer parts including a computer main board, a power supply device, floppy and hard diskdrives and a CD-ROM player, a plurality of clamping devices respectively symmetrically fastened to the vertical frame bars at different elevations, and four cover panels respectively fastened to the clamping devices and covered on the rack at four sides, the cover panels each having a plurality of coupling members respectively fastened to the clamping devices at the vertical frame bars, and openings for the passing of power cables and signal lines. A sponge pad may be respectively covered on the bottom board and the intermediate board for positive positioning of the computer parts. The intermediate board has an opening for the passing of power cables and/or signal lines. As an alternate form of the present invention, cover panels and clamping devices are eliminated, and a plastic duct cover is directly covered on the rack for protection against dust. The dust cover has openings for the passing of power cables and signal lines.

DETAILED DESCRIPTION OF THE PREFERRED EMBODIMENT

Figure 1:
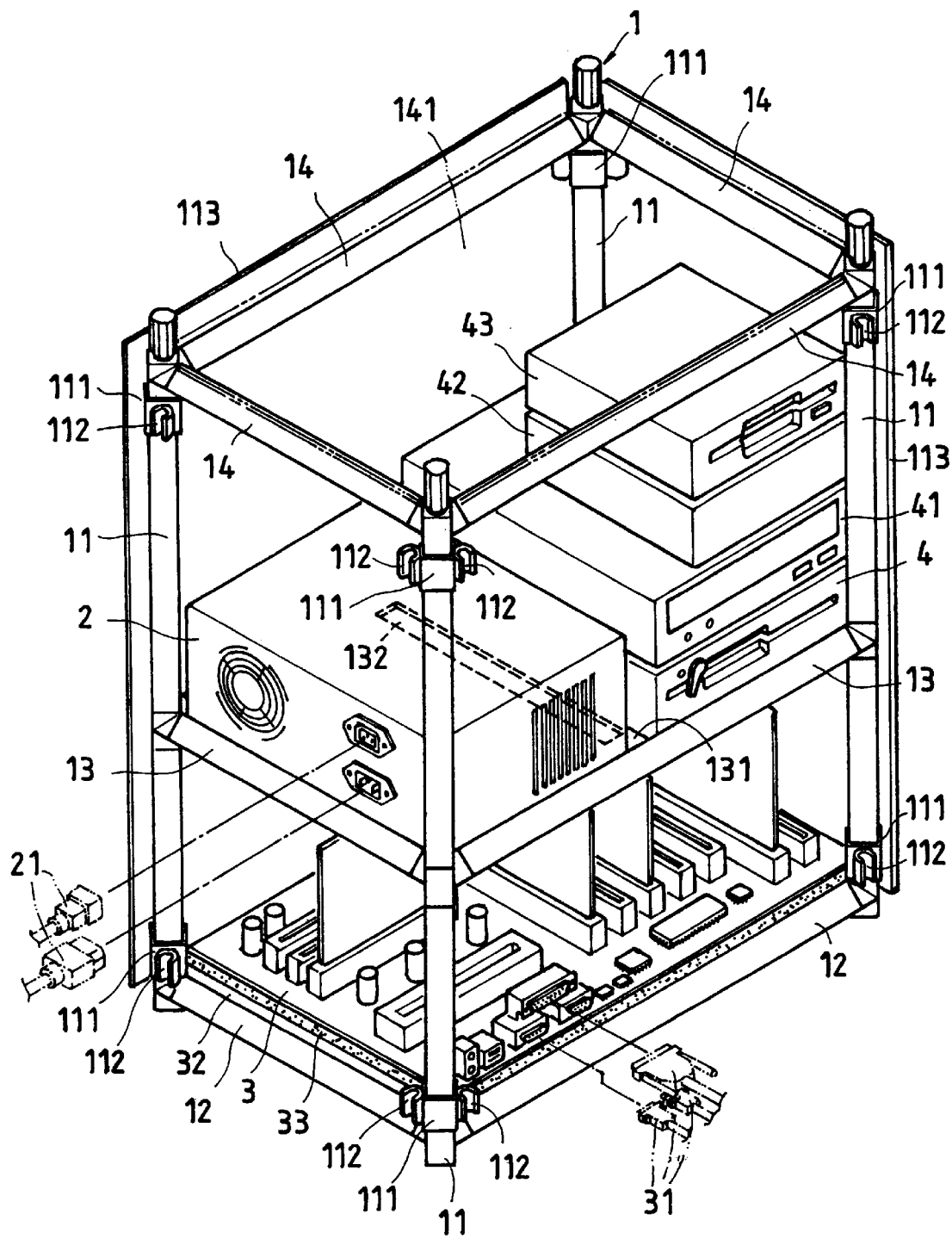
FIG. 1 is a perspective view of a computer mainframe housing according to one embodiment of the present invention (after removal of two adjacent cover panels).
Figure 2:
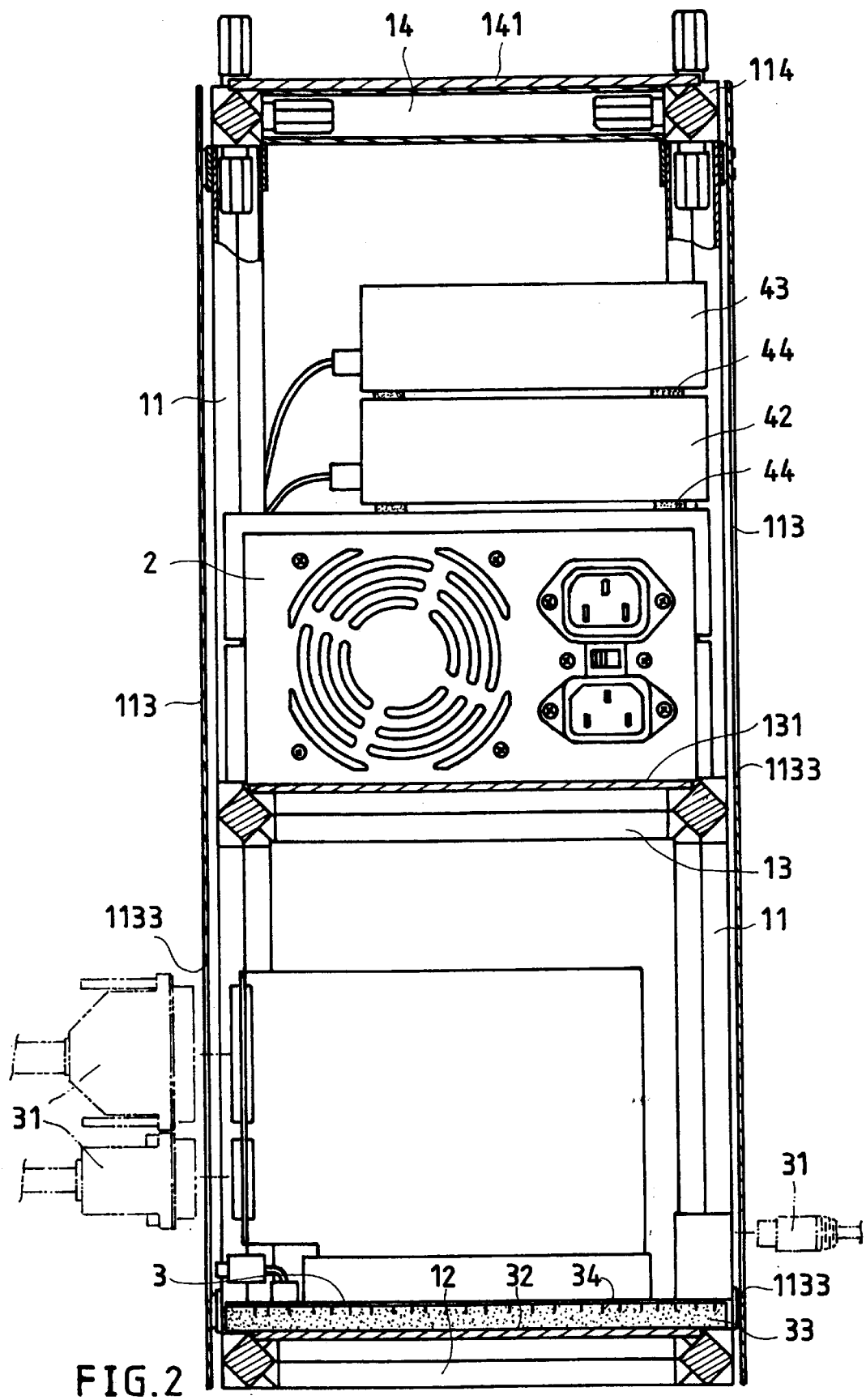
FIG. 2 is a sectional view showing an application example of the present invention.
Figure 3:
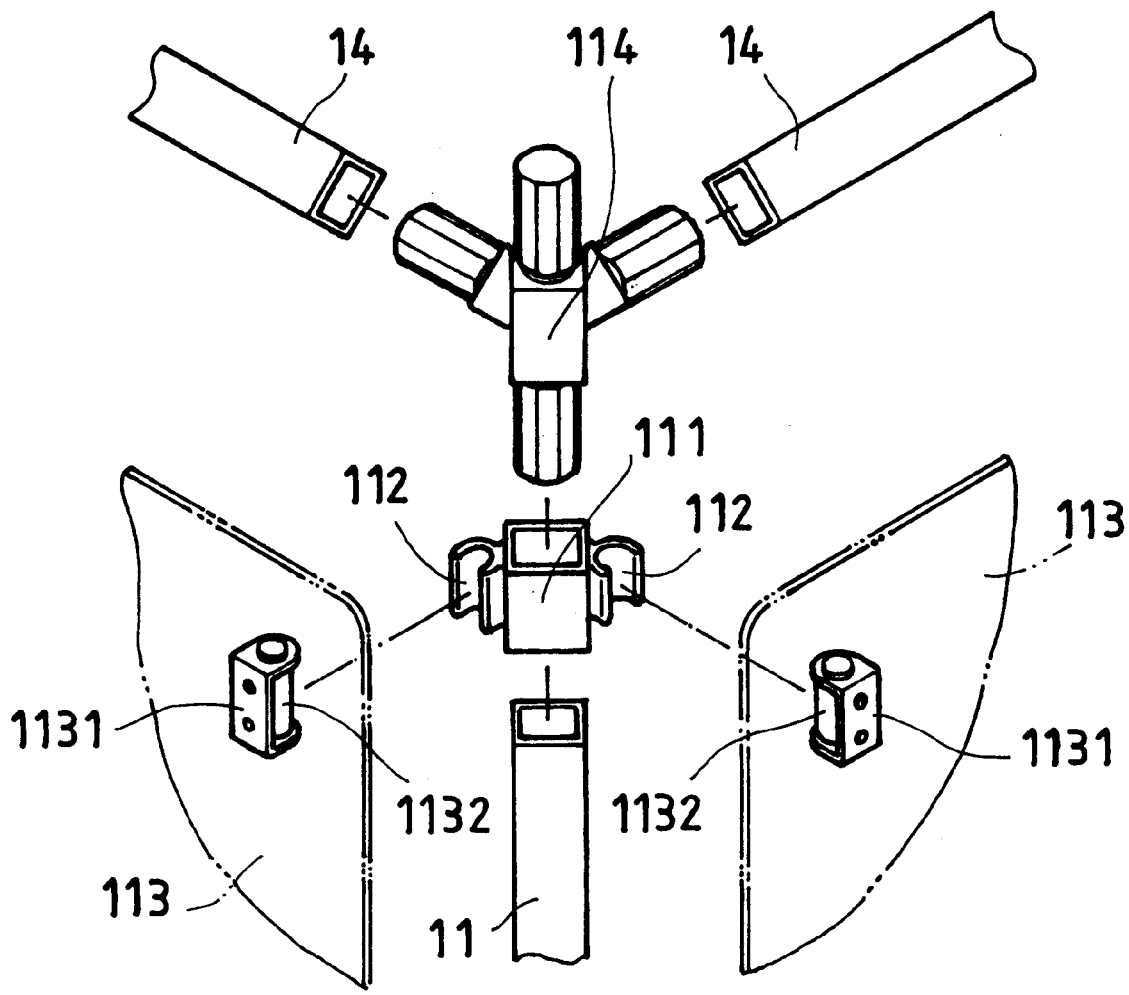
FIG. 3 is an exploded view in an enlarged scale of a part of the computer mainframe housing shown in FIG. 1, showing the relation between the four-way connector, the frame bars, the clamping device, and the coupling members at the cover panels.
Figure 4:
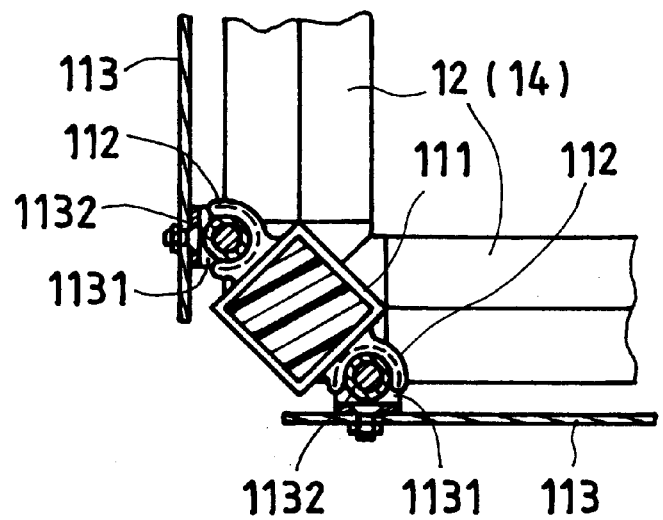
FIG. 4 is a side view in section in an enlarged scale of a part of the computer mainframe housing shown in FIG. 1, showing a clamping device fastened to one vertical frame bar, and one cover panel fastened to one clamping portion of the clamping device.
Figure 5:
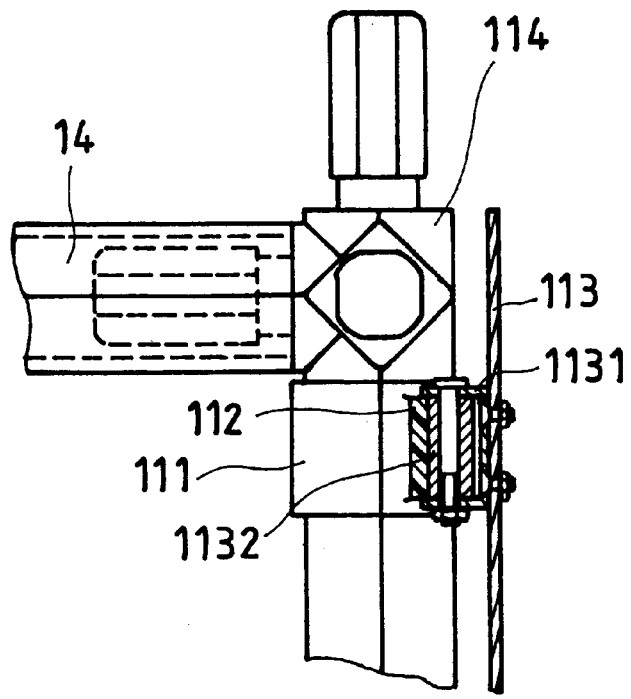
FIG. 5 is a top view in section in an enlarged scale of a part of the computer mainframe housing shown in FIG. 1, showing the two adjacent cover panels fastened to the clamping portions of one clamping device.
Figure 6:
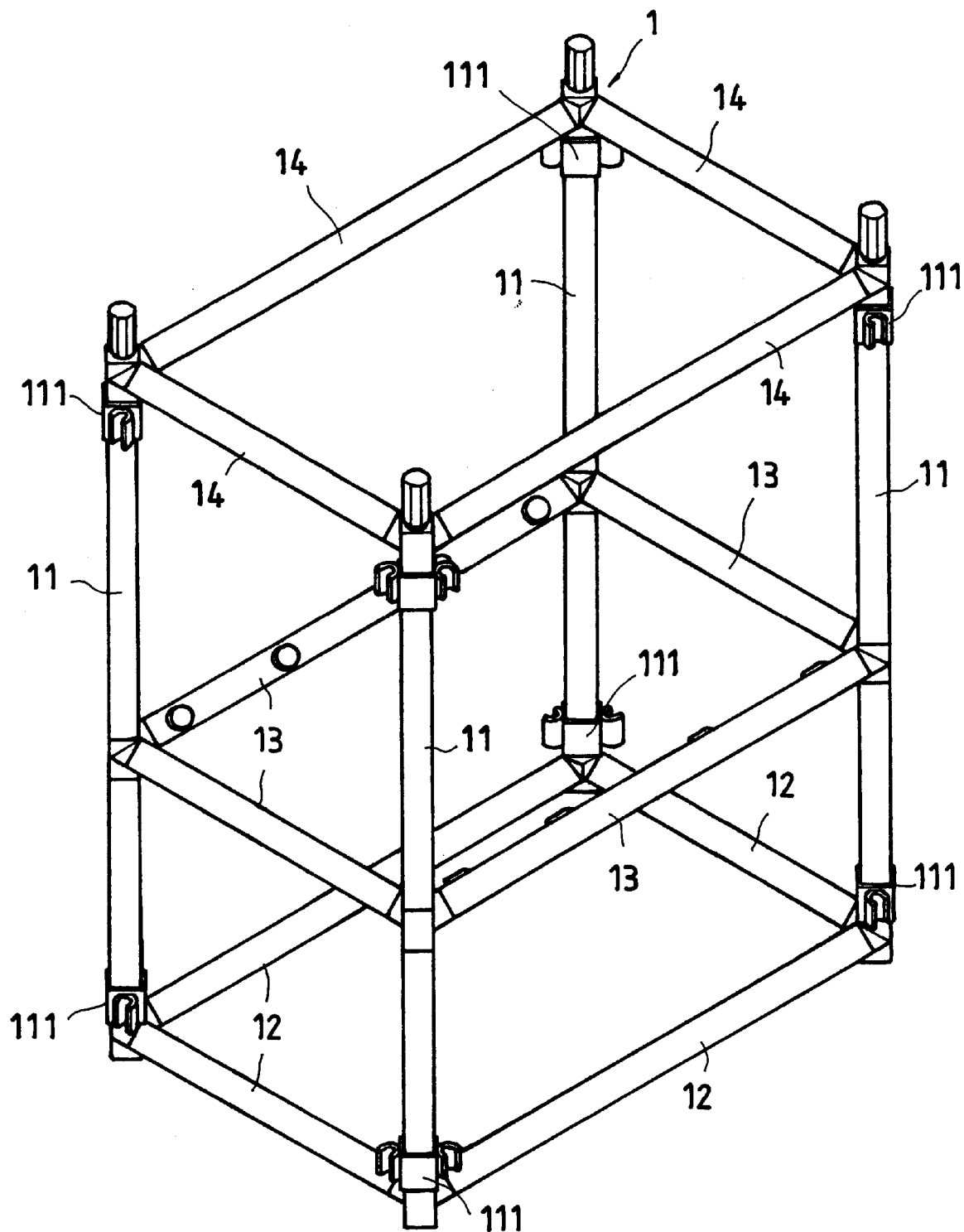
FIG. 6 is a perspective view of the rack for the computer mainframe housing shown in FIG. 1.

Referring to FIGS. from 1 through 7, a computer housing is shown comprised of a rectangular rack 1. The rectangular rack 1 is a hollow frame structure formed of four-way connectors 114, vertical frame bars 11, and horizontal frame bars 12, 13 and 14. A bottom board 32, at least one intermediate board 131 and a top board 141 are respectively mounted on the horizontal frame bars 12, 13 and 14 at different elevations. In the embodiment shown in FIGS. from 1 through 5, there is provided one intermediate board 131. In the embodiment shown in FIG. 7, there are provided three intermediate boards 131 arranged at different elevations between the top board 141 and the bottom board 32. A sponge pad 33 is covered on the top side wall of the bottom board 32 to support a main board 3. Pins 34 of component parts at the main board 3 are extended out of the bottom side wall of the main board 3, and inserted into the sponge pad 33 to secure the main board 3 in place. The intermediate board 131 has an opening 132 for the passing of cables. A power supply unit 2 is mounted on the intermediate board 131. Floppy diskdrives 4 and 43, a hard diskdrive 42 and a CD-ROM player 41 are arranged in a stack and supported on the intermediate board 131 at one side of the power supply unit 2. The power supply unit 2, the floppy diskdrives 4 and 43, the hard diskdrive 42 and the CD-ROM player 41 each have a plurality of anti-skid foot members 44 at the bottom for positive positioning. After mounting, respective power cables 21 and signal lines 31 are respectively connected to the power supply unit 2, the floppy diskdrives 4 and 43, the hard diskdrive 42 and the CD-ROM player 41. A plurality of clamping devices 111 are symmetrically fastened to the vertical frame bars 11 at different elevations to hold four cover panels 113 around the rack 1. The clamping devices 111 each comprise two clamping portions 112 arranged at right angles to hold two adjacent cover panels 113 at right angles. The cover panels 113 are respectively covered on the four vertical sides of the rack 1, each comprising a plurality of coupling members 1131 for fastening to the clamping devices 111 at the vertical frame bars 11. The coupling members 1131 each comprise a coupling rod 1132, which is forced into engagement with the clamping portion 112 at one clamping device 111. Openings 1133 are respectively provided at the cover panels 113 for the passing of the power cables 21 and/or the signal lines 31.

Figure 7:
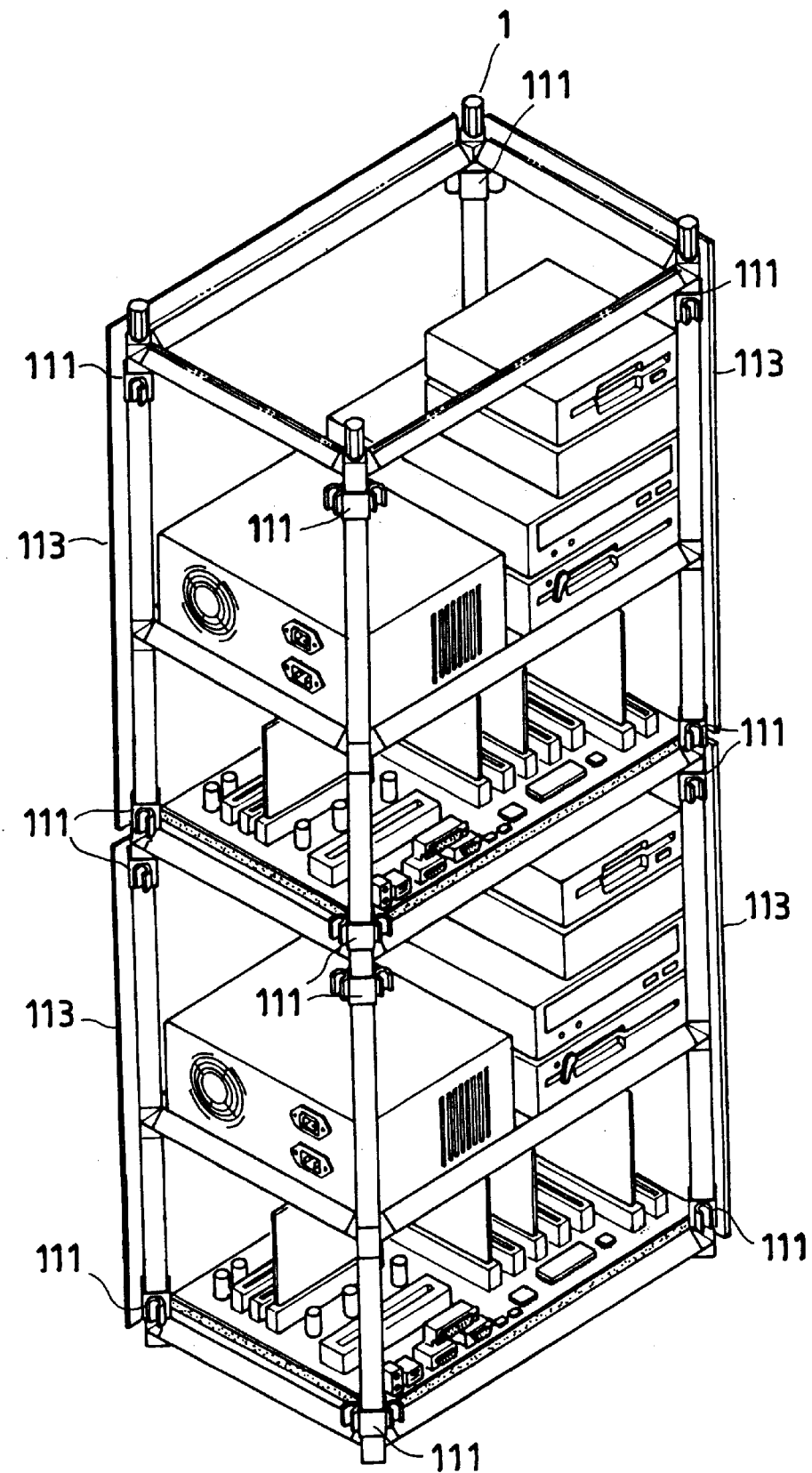
FIG. 7 is a perspective view of an alternate form of the present invention.

FIG. 7 shows an alternate form of the present invention. According to this alternate form, two computer mainframe units (each computer mainframe unit comprises a power supply unit, 3½" and 5¾" floppy diskdrives, a hard diskdrive and a CD-ROM player) are respectively arranged in the rack 1 at different elevations.

Figure 8:
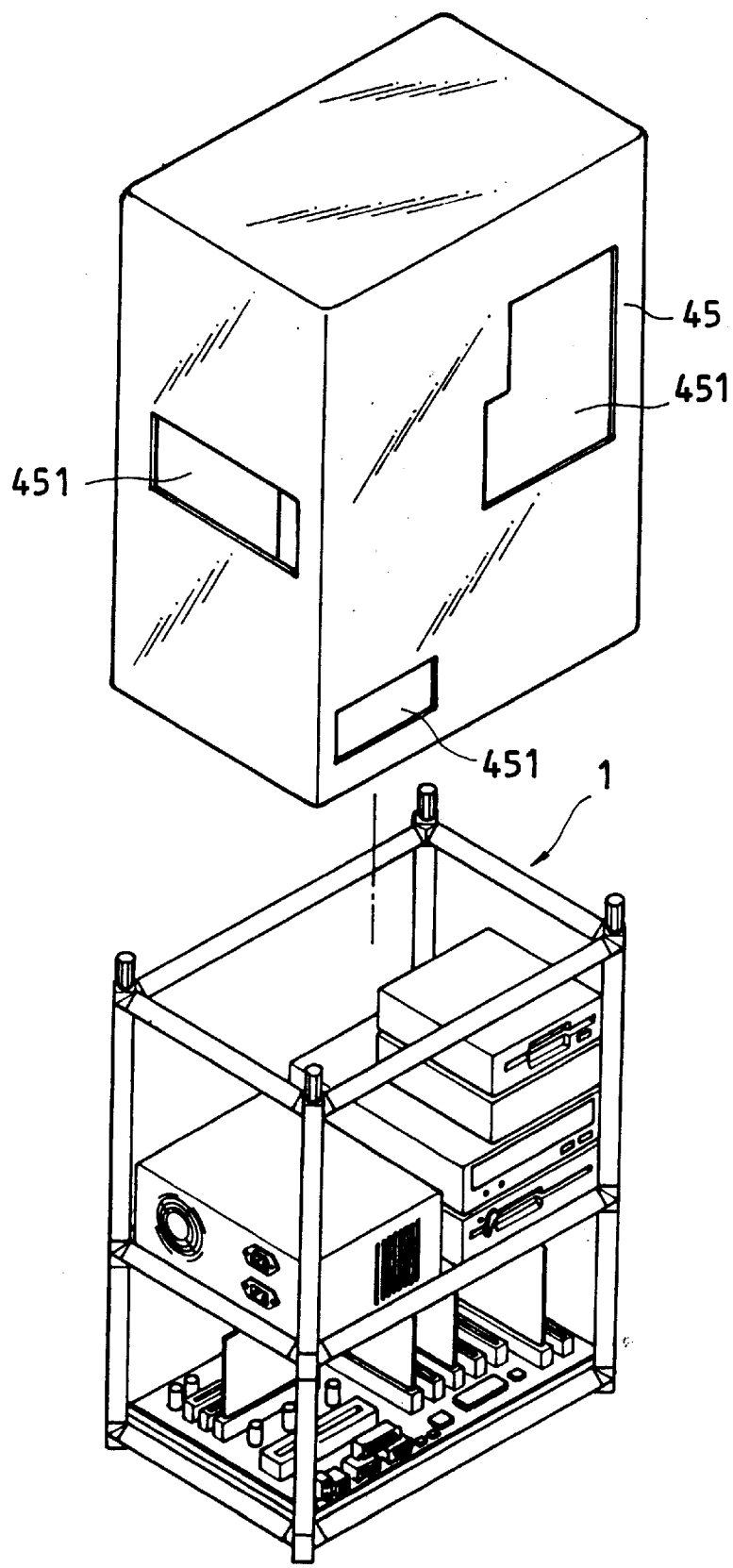
FIG. 8 shows another alternate form of the present invention.
Figure 9:
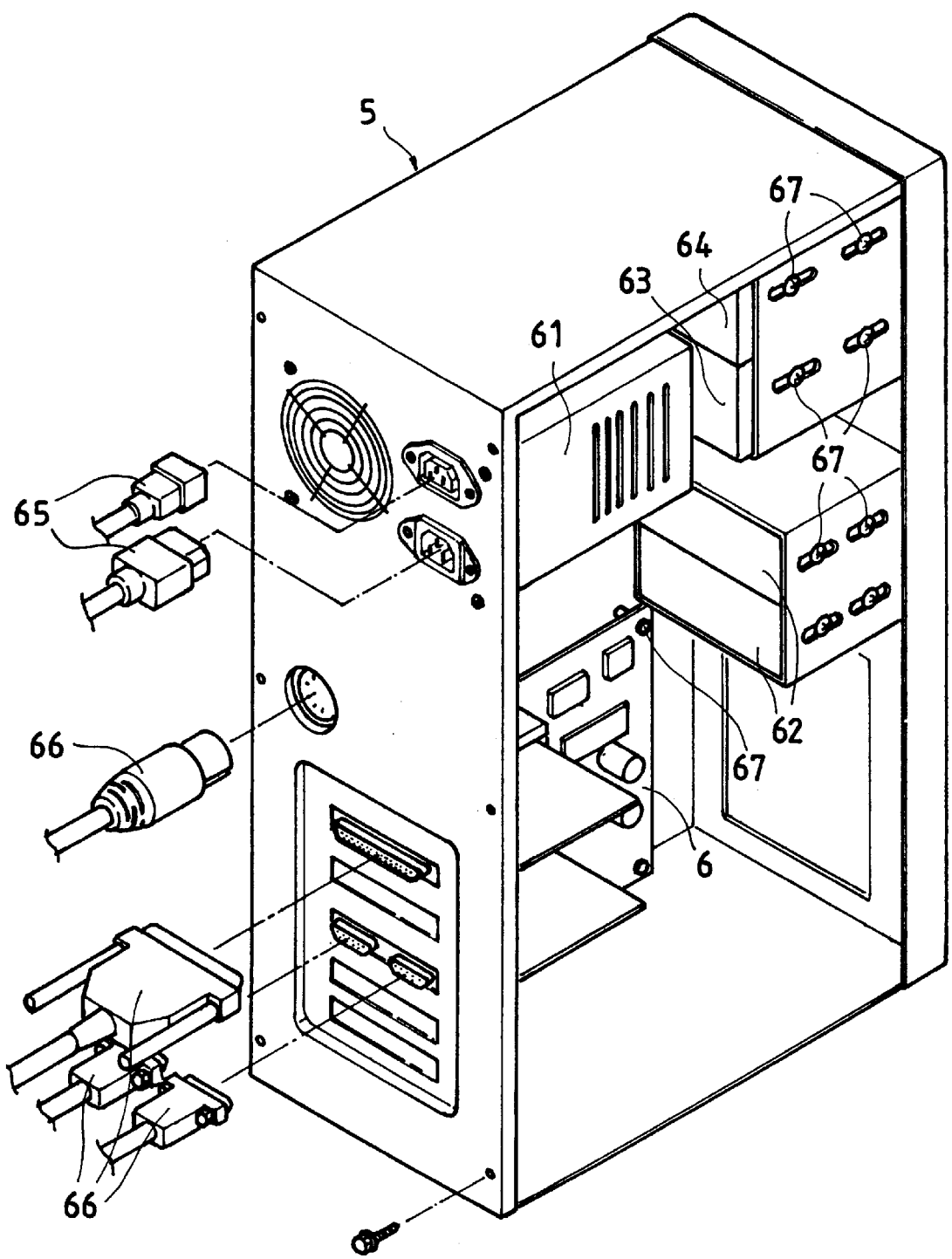
FIG. 9 is a perspective view of a portion of a computer housing known in the art.

Referring to FIG. 8, a cloth covering 45 may be covered on the rack 1 for protection against dust. The cloth covering 45 can be made of plastic sheet material, having different openings 451 at predetermined locations for the passing of power cables and/or signal lines.

It is to be understood that the drawings are designed for purposes of illustration only, and are not intended as a definition of the limits and scope of the invention disclosed.

What the invention claimed is:

1. An assembly for housing a plurality of computer components in selectively accessible manner comprising:
   (a) a rack including:
      (1) a plurality of vertical and horizontal frame bars;
      (2) a plurality of four-way connectors for coupling said frame bars one to another to define a plurality of vertically spaced levels; and,
      (3) top and bottom boards supported by predetermined ones of said horizontal frame bars at respective ones of said vertically spaced levels;
   (b) a plurality of clamping devices each detachably coupled to one of said frame bars, each said clamping device including at least a pair of clamping portions extending therefrom in angularly offset manner;
   (c) a plurality of panels releasably coupled to said clamping devices, said panels each having a substantially planar inner side portion and at least one coupling portion extending transversely therefrom, each said coupling portion engaging at least one said clamping device clamping portion in detachable manner, at least one of said panels having formed therein an opening for the passage of cables therethrough wherein at least one said coupling portion of each said panel includes a coupling rod inserted in snap-fit manner within said clamping portion of one said clamping device.

2. The assembly as recited in claim 1 wherein said rack further includes at least one intermediate board supported by predetermined ones of said horizontal bars and disposed in vertically offset manner between said top and bottom boards.

3. The assembly as recited in claim 1 wherein at least one of said boards is substantially covered by a sponge pad for securely retaining a computer circuit board positioned thereon.

4. The assembly as recited in claim 2 wherein said bottom board and said at least one intermediate board are each substantially covered by a sponge pad for securely retaining a computer circuit board positioned thereon.

\* \* \* \* \*